Dec. 30, 1924. 1,521,494
S. B. WILLIAMS
GLARE PROTECTOR
Filed Dec. 14, 1922
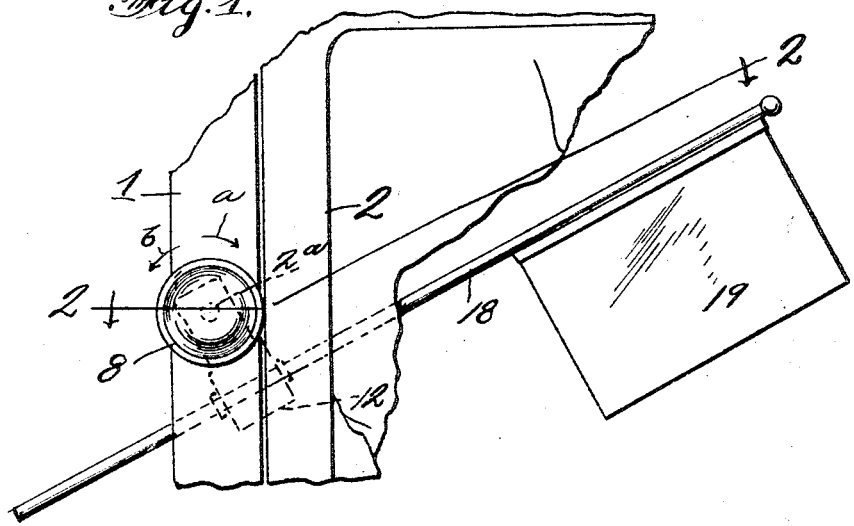
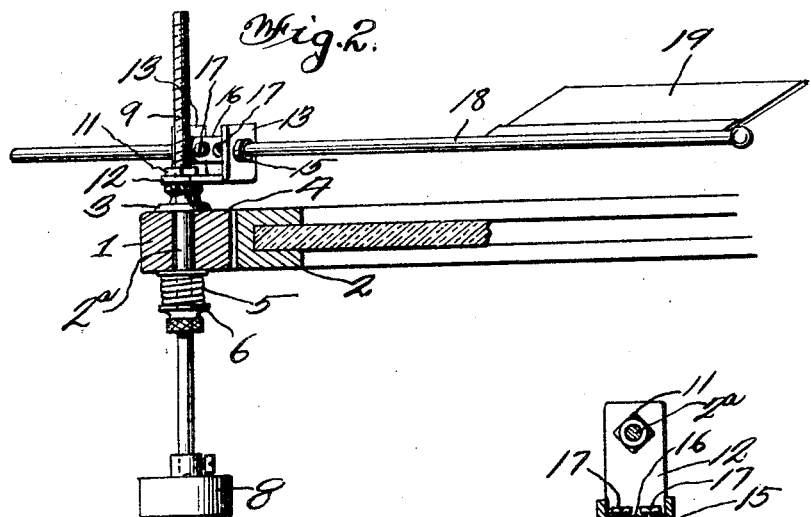
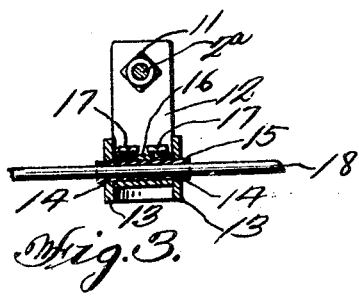
Inventor
S. B. Williams
By D. Swift
Attorney Patented Dec. 30, 1924.

1,521,494

UNITED STATES PATENT OFFICE.

SAMUEL BALLARD WILLIAMS, OF MERIDIAN, MISSISSIPPI.

GLARE PROTECTOR.

Application filed December 14, 1922. Serial No. 606,818.

*To all whom it may concern:*

Be it known that I, SAMUEL BALLARD WILLIAMS, a citizen of the United States, residing at Meridian, in the county of Lauderdale, State of Mississippi, have invented a new and useful Glare Protector; and I do hereby declare the following to be a full, clear, and exact description of the invention, such as will enable others skilled in the art to which it appertains to make and use the same.

The invention relates to glare protectors, and has for its object to provide a device of this character, which is pivotally connected to the windshield frame of an automobile by a shaft extending through the frame and provided with a bracket on its outer end, which bracket supports an angularly disposed shaft having a colored piece of transparent material thereon. The shaft when rotated by the operator of the automobile causes the transparent material to be moved either to a position in front of the operator's eyes for shielding the eyes against the glare of approaching lights, or away from a position in front of the operator's eyes.

A further object is to provide spring means for frictionally holding the operating shaft against easy displacement. Also to provide the bracket with means whereby the shield carrying shaft may be adjusted and held in various positions.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a view in elevation of the inside of a portion of a windshield frame and windshield, showing the device applied thereto.

Figure 2 is a sectional view taken on line 2—2 of Figure 1.

Figure 3 is a view looking into the bracket, showing the means for holding the adjustable shaft in section.

Referring to the drawing, the numeral 1 designates the vertical side of a conventional form of windshield frame and 2 a windshield disposed therein in the usual manner. Extending through the side 1 of the windshield frame is an operating shaft $2^a$, which shaft is horizontally disposed and is provided with a flange 3 which engages the front side 4 of the frame and with a coiled spring 5, which is interposed between a member 6 carried by the shaft 2 and a washer 7 which engages the rear side of the frame. It will be seen that the expansive action of the coiled spring 5 will frictionally hold the shaft 2 in any position to which it may be rotated by an operator who grasps the finger engaging member 8 and rotates the same.

Secured on the outer end 9 of the shaft 2 by means of a jam nut 11 is a bracket 12, which bracket is provided with spaced ears 13. Frictionally mounted at 14 in the ears 13 is a sleeve 15, and disposed on the sleeve 15 and interposed between the ears 13 is a second sleeve 16 having set screws 17 extending therethrough whereby the sleeve 16 may be locked to the sleeve 15, and at the same time the sleeve 15 which is slightly pliable is forced into binding and holding engagement with the glare protector shaft 18, after the shaft has been adjusted longitudinally to the desired position for positioning the colored transparent member 19 in a position where it will be in front of the eyes of the operator and prevent the glare of the lights from an approaching vehicle from blinding the operator.

When the operator desires to move the protector into operative position the finger engaging member 8 is moved in the direction of the arrow *a* and when it is desired to move the device to an inoperative position the operator moves the device in the direction of the arrow *b*.

From the above it will be seen that a glare protector is provided which is simple in construction, the parts reduced to a minimum and one wherein the device may be easily and quickly applied to various types of windshields.

The invention having been set forth what is claimed as new and useful is:—

The combination with a windshield, of a glare protector carried thereby, said protector comprising a horizontally disposed shaft extending through the frame of the windshield, a handle member carried by the rear end of the shaft, a spring tensioning means carried by the shaft for frictionally holding the shaft against rotation, a bracket carried by the forward end of the shaft, said bracket being provided with spaced ears disposed to one side of the shaft, a sleeve extending through the ears and frictionally held therein, a glare protector shaft extending through the sleeve, a sleeve to one side of said first mentioned shaft surrounding the first mentioned sleeve and interposed between the ears and forming means for forcing the first mentioned sleeve into frictional and binding engagement with the glare protector shaft and preventing axial movement of the sleeve extending through the ears and the shaft and set screws carried by the sleeve interposed between the ears of the bracket.

In testimony whereof I have signed my name to this specification in the presence of two subscribing witnesses.

SAMUEL BALLARD WILLIAMS.

Witnesses:
J. C. RANDALL,
C. W. SEVIER.